UNITED STATES PATENT OFFICE.

ADOLPH D. FEST, OF CHICAGO, ILLINOIS.

PROCESS FOR THE UTILIZATION OF WASTE SULPHITE LIQUOR.

1,218,638.  Specification of Letters Patent.  Patented Mar. 13, 1917.

No Drawing.  Application filed October 30, 1915. Serial No. 58,875.

*To all whom it may concern:*

Be it known that I, ADOLPH D. FEST, residing in Chicago, county of Cook, and State of Illinois, have invented certain new and useful Improvements in Processes for the Utilization of Waste Sulphite Liquor, of which the following is a specification.

My invention relates to processes for the utilization of the waste liquor produced in the manufacture of wood pulp or cellulose according to the sulphite or Mitscherlich process, which process is well known and requires no description.

The waste liquor resulting from the manufacture of sulphite cellulose, after boiling in the digester, contains in solution or in combination with the bisulphite, for instance calcium bisulphite $Ca(HSO_3)_2$, approximately fifty per cent. of the weight of the dry wood. It has been customary heretofore to run this liquor into the water course or sewer as a waste product, as there has been no process available for winning the constituents thereof in a simple, practical and economical way.

The valuable ingredients of such waste sulphite liquor are a double compound of lignin with bisulphite; sugar in the forms of mannose, galactose and xylose; resin; fat; carbohydrates; albumen; etc. The exact composition of such double compounds of lignin with bisulphite is probably not definitely known at the present time, but the formulæ of same are given by scientists. For instance, for the base calcium the formula is stated as $C_{33}H_{39}(CH_3)_3S_2O_{22}Ca_2$. Numerous suggestions have been made for utilizing one or the other of the waste sulphite liquor ingredients, and also for producing new articles from this waste product, but none of the proposed methods has proved generally acceptable to the industry, so that with the exception of a few instances where some limited recovery from or use of this liquor is practised the general rule still prevails among the interested manufacturers of simply throwing it away, in many instances thereby contaminating water courses and otherwise creating serious objection.

The objects of my present invention are chiefly the quantitative recovery of sulphur, the regeneration of the base, for instance CaO, MgO or NaOH, the utilization of the organic matter of the liquor as a fuel, the production of alcohol or other substances from the sugar contained, and also to avoid the objections incident to the discharge of the liquor into water courses, drains, or upon the open land. Other objects and advantages will appear hereinafter.

In practising this invention to obtain the numerous advantages herein pointed out, I prefer to do so in the following manner: I first preferably concentrate the waste liquor, broadly to reduce its bulk, by any approved method, for instance in a vacuum, suitably to approximately 30 degrees Baumé, and conduct the water vapors and the gas into cooling chambers to obtain, by condensation of the vapors, the free sulphurous gas ($SO_2$) which escapes during the concentration. The concentrated liquor is then mixed with a basic reagent capable of neutralizing the free sulphurous acid, for instance freshly burnt lime, CaO, so as to leave the sulphurous acid content not strong enough to hinder or prevent fermentation, say to a strength not to exceed .025 per cent. of $SO_2$; but the addition of the basic reagent must not be carried on until the solution becomes alkaline. A substance such as compressed yeast or any other suitable form of yeast or fermenting agent is then added for inciting alcoholic fermentation, say compressed yeast from one and one-half per cent. to three per cent. of the weight of the sugar content. After fermentation has been completed, which should be in about twenty-four hours, the liquor is decanted from the yeast, and the solution is preferably made weakly alkaline by additional base, for instance lime, CaO. To the dilute alcohol thus formed other alcohol is added at this time sufficient to precipitate completely the double compound of lignin with bisulphite, and owing to the previous concentration, the amount of alcohol necessary for this precipitation is very much less than if the waste liquor were not so concentrated. This precipitate, after being separated from the solution, say by decantation or filtration, is calcined in an oven or kiln of any approved form. The gases escaping during the process of calcination contain all of the sulphur bound in organic form (which is about three-fourths of the total sulphur of the double compound of lignin with bisulphite), as sulphurous gas, $SO_2$, mixed with carbon dioxid, nitrogen, oxygen, water, etc. The gases are then conducted into an apparatus containing a substance capable of fixing or absorbing the sulphurous gas, or are treated otherwise according to any approved method with the object of extracting the sulphurous gas from them. I prefer to use for this purpose such a tower as is in ordinary use for the production of bisulphite liquor in the same industry, such tower containing for instance the carbonate or sulphite of such a base as it may be desired to obtain the bisulphite from. For instance, if calcium bisulphite is desired, then the carbonate or the sulphite of calcium would be employed. Water is discharged through the tower, all as is well understood, and the bisulphite liquor coming from the apparatus, after having reached the required strength, is ready for new use in the digester.

The approximately one-fourth part of the total sulphur bound in inorganic form in the double compound of lignin with bisulphite, as well as substantially all of the base contained in the bisulphite liquor used in the digester, together with the sulphite obtained through neutralization of the free sulphurous gas with the base, as lime, are present in the ashes mostly in the form of sulphite, for instance $CaSO_3$, mixed with more or less sulphide and sulphate according to the manner in which the combustion process has been conducted. If magnesium bisulphite liquor is used in the digester the ashes may contain magnesium oxid MgO, magnesium sulphite $MgSO_3$, and magnesium sulphate $MgSO_4$ in various proportions. If no sulphide is present in the ashes when calcium or sodium is employed as a base, the ashes may simply be thrown into the tower, where, in the presence of water, the sulphurous gas reacts with the monosulphite (and also with the magnesium carbonate formed from MgO of the ashes and $CO_2$ of the gases of calcination in the case of magnesium bisulphite used) to form bisulphite. A small amount of the sulphide present, however, will be no objection to this method of treating the ashes as such small amount will also be converted into the bisulphite with the formation of a negligible amount of free sulphur. If appreciable quantities of sulphide are present in these ashes, I preferably heat them with water to boiling temperature and conduct sulphurous gas through the liquid. The sulphide is thereupon decomposed and bisulphite and free sulphur in a good filterable form are obtained. This last mentioned bisulphite, after elimination of the free sulphur, is ready for new use in the digester, and the free sulphur may be burned to produce $SO_2$, which may be utilized to produce additional bisulphite liquor.

The alcohol used for the precipitation together with alcohol obtained through fermentation is distilled off.

In practising the invention where the alcohol feature of this process is not employed, instead of concentrating the waste sulphite liquor to say approximately 30° Baumé, the liquor is evaporated to dryness, by any approved method, or solid substance may be won or obtained therefrom by any other available means. Thereupon calcination is made of the solid substance thus obtained, and the gases of calcination are passed into the means for fixing or absorbing the sulphurous gas, for instance the tower mentioned, the process in this respect being the same as already described. The ashes of calcination are also treated as hereinabove set forth. Thus the sulphur from both the organic and inorganic constituents of the spent as well as the base of the original bisulphite liquor are recovered.

While, as thus indicated, the alcohol feature of the process may be omitted, I desire to point out that by employing this feature the very notable advantages are obtained of saving considerable cost incident to the work of concentrating the waste sulphite liquor completely and also in providing a value for the sugar content thereof.

It is also pointed out that a heat of approximately 12,000 B. T. U. per ton of pulp manufactured according to the sulphite process is obtained by the calcination of the organic matter obtained from the waste liquor thereof. This heat may be utilized for various purposes, for instance the distillation of the alcohol used and formed in this process.

In the Mitscherlich process calcium bisulphite, magnesium bisulphite or sodium bisulphite may be used; but, owing to the loss of the waste sulphite liquor according to the practice heretofore, magnesium bisulphite or sodium bisulphite have not been employed alone to any notable extent, although such use would be quite advantageous inasmuch as the monosulphites of magnesium and sodium respectively formed during the "blowing off" of the free sulphurous acid after digestion are easily soluble in water and consequently easily washed out from the pulp, while calcium sulphite is substantially insoluble in water and difficultly so washed out. By my present process the regeneration of the base enables manufacturers to use advantageously either the magnesium bisulphite or the sodium bisulphite as the digesting agent.

I claim:

1. The process for utilizing waste sulphite liquor which comprises separating in any approved manner from such liquor solid substances, calcining such solid substances, confining the gases of calcination, and passing the gases of calcination into association with means capable of extracting sulphurous gas therefrom.

2. The process for utilizing waste sulphite liquor which comprises separating in any approved manner from such liquor solid constituents, calcining such solid constituents, confining the gases of calcination, passing the gases of calcination into association with means capable of extracting sulphurous gas therefrom, and forming bisulphite liquor from the sulphurous gas extracted from such gases of calcination.

3. The process for utilizing waste sulphite liquor which comprises separating in any approved manner from such liquor solid substances, calcining such solid substances, and passing the gases of calcination into association with ashes of such calcination in the presence of water.

4. The process for utilizing waste sulphite liquor which comprises inciting fermentation of sugar therein by the addition of yeast, separating from the liquor after the fermentation a product of fermentation, separating from the remaining liquor solid substances, calcining such solid substances, and forming bisulphite liquor from the sulphurous gas given off by such calcination.

5. The process for utilizing waste sulphite liquor which consists in concentrating the waste liquor; neutralizing the concentrated liquor until it is but slightly acid; inducing alcoholic fermentation in the liquor; precipitating solid constituents from the solution; calcining the precipitate thus obtained; extracting sulphurous gas from the gases formed by calcining said precipitate.

6. The process for utilizing waste sulphite liquor which consists in concentrating the waste liquor; neutralizing the concentrated liquor until it is but slightly acid; inducing alcoholic fermentation in the liquor; precipitating solid constituents from the solution; calcining the precipitate thus obtained; forming bisulphite liquor from the sulphurous gas given off by calcining said precipitate.

7. The process for utilizing waste sulphite liquor which consists in concentrating the waste liquor; neutralizing the concentrated liquor until it is but slightly acid; inducing alcoholic fermentation in the liquor; precipitating solid constituents from the solution; calcining the precipitate thus obtained; forming bisulphite liquor from the sulphurous gas given off by calcining said precipitate; using the ashes of calcination for recovery of the base originally used in making the bisulphite liquor and as means for fixing sulphurous gas of calcination.

8. The process for utilizing waste sulphite liquor which consists in concentrating the waste liquor; neutralizing the concentrated liquor until it is but slightly acid; inducing alcoholic fermentation in the liquor; precipitating solid constituents from the solution; calcining the precipitate thus obtained; extracting sulphurous gas from the gases formed by calcining said precipitate; forming bisulphite liquor with the sulphurous gas given off by calcining said precipitate; using the ashes of calcination to form with sulphurous gas a bisulphite liquor and free sulphur.

9. The process of utilizing waste sulphite liquor which consists in concentrating the waste liquor to a suitable degree for convenient handling; neutralizing the concentrated liquor until it is but slightly acid; inducing alcoholic fermentation in the liquor; making the fermented solution alkaline; precipitating solid constituents from the solution; calcining the precipitate thus obtained; extracting sulphurous gas from the gases formed by calcining said precipitate.

10. The process of utilizing waste sulphite liquor which consists in concentrating the waste liquor; neutralizing the concentrated liquor until it is but slightly acid; inducing alcoholic fermentation in the liquor; making the fermented solution alkaline; precipitating solid constituents from the solution; calcining the precipitate thus obtained; forming bisulphite liquor with the sulphurous gas given off by calcining the precipitate.

11. The process of utilizing waste sulphite liquor which consists in concentrating the waste liquor; neutralizing the concentrated liquor until it is but slightly acid; inducing alcoholic fermentation in the liquor; making the fermented solution alkaline; precipitating solid constituents from the solution; calcining the precipitate thus obtained; forming bisulphite liquor with the sulphurous gas given off by calcining the precipitate; using the ashes of calcination for fixing the sulphurous gas of calcination.

12. The process of utilizing waste sulphite liquor which consists in neutralizing the liquor until it is but slightly acid; inducing alcoholic fermentation in the liquor; precipitating solid constituents from the solution; calcining the precipitate thus obtained; forming bisulphite liquor from the sulphurous gas given off by calcining the precipitate.

13. The process of utilizing waste sulphite liquor which consists in inducing alcoholic fermentation in the liquor; precipitating solid constituents from the solution; calcining the precipitate thus obtained; forming bisulphite liquor with the sulphurous gas given off by calcining the precipitate.

ADOLPH D. FEST.

Witnesses:
T. D. BUTLER,
M. M. KRIESAND.